United States Patent
Monico

(12) 
(10) Patent No.: US 6,259,369 B1
(45) Date of Patent: Jul. 10, 2001

(54) LOW COST LONG DISTANCE RFID READING

(75) Inventor: Dominick L. Monico, Williamsville, NY (US)

(73) Assignee: Moore North America, Inc., Grand Island, NY (US)

( * ) Notice: Subject to any disclaimer, the term of this patent is extended or adjusted under 35 U.S.C. 154(b) by 0 days.

(21) Appl. No.: 09/408,519

(22) Filed: Sep. 30, 1999

(51) Int. Cl.[7] .................................................. G08B 13/14
(52) U.S. Cl. .................................... 340/572.8; 340/572.7; 29/600; 29/601; 29/846; 343/700 MS; 156/291; 156/292; 428/901; 361/765
(58) Field of Search .......................... 340/572.8, 572.7; 29/846, 600, 601; 343/700 MS; 156/291, 292; 361/765; 428/901

(56) References Cited

U.S. PATENT DOCUMENTS

| | | |
|---|---|---|
| 5,444,223 | 8/1995 | Blama ................................. 235/435 |
| 5,497,140 | 3/1996 | Tuttle ................................. 340/10.1 |
| 5,508,684 | 4/1996 | Becker ............................... 340/572.5 |
| 5,566,441 | 10/1996 | Marsh et al. .......................... 29/600 |
| 5,781,110 | 7/1998 | Habeger, Jr. et al. ............ 340/572.5 |
| 5,843,329 | 12/1998 | Deetz ................................. 252/62.54 |
| 6,018,299 * | 1/2000 | Eberhardt .......................... 340/572.7 |
| 6,045,652 * | 4/2000 | Tuttle et al. .......................... 156/292 |
| 6,091,332 * | 7/2000 | Eberhardt et al. ................. 340/572.1 |
| 6,100,804 * | 8/2000 | Brady et al. ....................... 340/572.7 |
| 6,107,920 | 8/2000 | Eberhardt et al. ................ 340/572.7 |

FOREIGN PATENT DOCUMENTS

| | | |
|---|---|---|
| 0 615 285 | 9/1994 | (EP) . |
| 97 14112 | 4/1997 | (WO) . |
| 98 40930 | 9/1998 | (WO) . |

OTHER PUBLICATIONS

Motorola Press Release "Motorola Unveils Revolutionary Wireless Smart Label Technology", Mar. 2, 1999.

* cited by examiner

Primary Examiner—Benjamin C. Lee
(74) Attorney, Agent, or Firm—Nixon & Vanderhye PC

(57) ABSTRACT

In the production radio frequency (RF) sensable objects, it is possible to produce a package, envelope, or like container which has enhanced read distance, producable by a simple method. Large areas are printed on the envelope or package in conductive ink which are separated by a non-conductive portion of the package or envelope and function as an RF antenna. Then by placing an otherwise conventional label with an RFID chip associated with it so that it bridges the conductive ink portions of the RF antenna, a much easier to sense or read product is produced. The conductive ink can be applied in a pattern, logo, and letters or character indicia. The label may have conductive pressure sensitive adhesive on one face, which actually connects the antenna sections to the RFID chip to form the operable structure that can be sensed by an RF receiver at a distance of three meters or more.

28 Claims, 3 Drawing Sheets

LOW COST LONG DISTANCE RFID READING

BACKGROUND AND SUMMARY OF THE INVENTION

Radio frequency (RF) technology is becoming increasingly more common in a wide variety of uses. RF technology is relatively easy to utilize and RF sensing is well developed and recognized in many areas, such as inventory control, to prevent theft, proper routing of packages or the like, etc.

As used with identifying, routing, or inventorying envelopes, packages or other containers, RF technology often utilizes labels as either the product containing the RF technology, or in association therewith. For example as shown in U.S. Pat. No. 5,497,140 a label (such as a postage stamp or a mailing label) is provided having a radio frequency identification (RFID) device and system mounted between opposing faces of the major surfaces of the label. An RFID chip is electrically connected to an RF antenna that is contained with, or is part of, the label, thereby allowing the label to be simply applied to an envelope or package in order to provide proper tracking. Further, Motorola has introduced wireless smart label technology using "BiStatix™ Smart Labels" to efficiently track mail containers. A typical BiStatix™ label is approximately four inches by four inches, and contains both the antenna and the chip, and has a read or sensing distance of about one meter (that is the RF receiver sensor must be within one meter of the labeled package in order for proper sensing). While this technology is very useful, there are many situations in which it is desirable to allow sensing at greater distances and/or perhaps with better accuracy, and with less chance for interference, and to do so in a simple and cost effective manner. According to the present invention that is possible.

According to the most basic aspect of the present invention, a container wall/surface has a relatively large RF antenna disposed thereon, typically by printing a wall or surface of the container (which may be a package or an envelope, of the types commonly mailed or otherwise sent for delivery) printed with conventional conductive ink. Very large areas of the envelope, package, or other container may be printed with the conductive ink in a simple manner, and the printing may be done in an aesthetic manner with various designs, geometric elements, or the like, or it may be done with recognizable letters or characters so that to one viewing the container it isn't clear that the RF technology has even been utilized therewith. Then an element of the container, such as flap of an envelope, or a carton flap of a package, which has the RF technology (particularly an RFID chip) associated therewith may be used to bridge electrically non-conductive material between portions of the large antenna that has been printed with conductive ink on the substrate. While a wide variety of techniques may be utilized, typically the chip is provided on a label which has electrically conductive adhesive (typically pressure sensitive adhesive), and the label can be placed into contact with spaced portions of the antenna that has been printed on the container, electrically connecting portions of the conductive ink which are spaced from each other to the RFID chip. In this way the container may be produced—with the large antenna (e.g. for example between 25–200 square inches, such as a 12 inch×12 inch area)—while the RFID chip is added at some other location at some remote point in time, allowing for simple manufacture. Utilizing the invention it is possible to very accurately sense or read an RFID chip associated with the envelope, package, or like container at distances of at least about two meters, and typically at least about three meters, for example between about two–five meters. Thus the invention provides improved functionality without significant cost, and in an easy and effective manner, which greatly facilitates utilization of RF technology, and enhances functionality thereof.

According to one aspect of the present invention there is provided a container comprising: At least one container wall having a surface area. A first area of conductive ink at least in part disposed on the container wall and spaced from a second area of conductive ink, the first and second areas of conductive ink separated by substantially electrically non-conductive material, the first and second areas of conductive ink comprising at least part of an RF antenna. A label having a first face, and a second face. The second face having adhesive over at least a portion thereof, capable of attaching the label to the container wall. The label having an RFID chip mounted thereon. And, electrically conductive material associated with the label second face and positioned to connect the first and second areas of conductive ink to the RFID chip when the label second face is placed in a position engaging the first and second areas of conductive ink and bridges the area of substantially non-conductive material, so that the container is detectable by an RF receiver.

The second area of the conductive ink may be disposed at least in part on the container wall, but the first and second areas may each cover, or at least touch, the plurality of walls, and different walls. The adhesive and the electrically conductive material associated with the label for bridging the first and second areas may be essentially one in the same—namely a conventional electrically conductive adhesive, most preferably a conventional electrically conductive pressure sensitive adhesive. Typically the RFID chip is mounted on the label second face, however it may be mounted on the first face with connections between the chip and the electrically conductive adhesive, or other electrically conductive components, on the second face of the label, and a covering layer may be provided over the RFID chip is desired. For example see co-pending application Ser. No. 09/393,291, filed Sep. 10, 1999 . The label first face may include at least one of human and machine readable indicia thereon, such as address information, postage, bar codes, etc.

The first area, and also the second area if desired, may be in the form of at least one recognizable letter or character, and the first and second areas may cooperate together to spell out a word, make a complete design or character, or the like. The conductive ink in the first and second areas may be printed in any aesthetic manner desired, forming geometric designs that are pleasing to the eye, conveying information, or the like.

Typically, the container comprises a package or envelope of substantially electrically non-conductive material, such as paper, cardboard, paper board, or like cellulosic materials. Tyvek® sheet material. etc. For example, the container may comprise a substantially prismatic package (or envelope), primarily of cellulosic material, and in that case, the substantially electrically non-conductive material separating the first and second areas of conductive ink may comprise a part of the package (or envelope) substantially devoid of conductive ink.

The container wall may be inside the final passage or other container, outside or both. However, preferably the container wall or walls containing the electrically conductive ink first and second areas is at least primarily (if not exclusively) on the exterior of the package.

Typically, the antenna areas are dimensioned, and the packages (or envelope) constructed so that the package (or envelope) is detectable by an RF receiver and at a distance of at least about 2 meters, preferably at least about 3 meters (e.g., about 2–5 meters). This is typically accomplished by providing a much larger antenna area, provided by the first and second areas of conductive ink, than in the conventional labels, which in the case of the Motorola BiStatix system are typically only about 4"×4" and detectable at a maximum distance of about a meter. According to the invention, for example, the first and second areas may collectively be more than 25 square inches, preferably more than 50 square inches, e.g., approximately 25–200 square inches. One particularly desirable size utilizable for many packages or large envelopes is about 12"×12" (e.g., about 140–150 square inches) of conductive ink forming the first and second areas defining the antenna.

According to another aspect of the present invention, the package or envelope is provided comprising the following components: At least one wall having a surface area. A first area of conductive ink at least in part disposed on the wall and spaced from a second area of conductive ink, the first and second areas of conductive ink separated by a substantially electrically non-conductive material, portion of the package or envelope, the first and second areas of conductive ink comprising at least part of an RF antenna. An element having first and second faces, and having an RFID chip mounted therewith. The second face of the element having electrically conductive pressure sensitive adhesive over at least a portion thereof, capable of attaching the element to the wall. Electrically conductive material associated with the element second face and positioned to connect the first and second areas of conductive ink to the RFID chip when the element second face is placed in a position engaging the first and second areas of conductive ink and bridges the area of substantially non-conductive material, so that the package or envelope is detectable by an RF receiver.

The wall may comprise a face of an envelope or package which is engaged by the flap to seal the envelope or package, and the element may comprise an envelope or package flap. The first and second areas collectively may be approximately 25 square inches–200 square inches, so as to allow detection by an RF receiver from two meters or more away. At least the first area may be in the form of at least one recognizable letter or character, geometric design, or other aesthetic rendering.

According to another aspect of the invention, there is provided a container comprising at least one container wall having a surface area. A first area of conductive ink at least in part disposed on the container wall and spaced from a second area of conductive ink, the first and second areas of conductive ink separated by substantially electrically non-conductive material, the first and second areas of conductive ink comprising at least part of an RF antenna. A label having a first face, and a second face. The second face having adhesive over at least a portion thereof, capable of attaching the label to the container wall. The label having an RFID chip mounted thereon. And, electrically conductive material associated with the label second face and positioned to connect the first and second areas of conductive ink to the RFID chip when the label second face is placed in a position engaging the first and second areas of conductive ink and bridges the area of substantially non-conductive material, so that the container is detectable by an RF receiver.

According to another aspect of the invention, there is provided a method of constructing an RF detectable package or envelope having at least one wall, and of substantially electrically non-conductive material, using an element having an RFID chip mounted thereon and an electrically conductive bridging portion, comprising: a) Printing electrically conductive ink on the package or envelope. Including the at least one wall, to define first and second areas of electrically conductive ink, separated from each other by a portion of the package or envelope substantially devoid of electrically conductive ink. b) Bringing the element into bridging contact between the first and second areas of electrically conductive ink to connect the first and second areas of conductive ink to the RFID chip by the element bridging portion operatively engaging the first and second areas of conductive ink, so that the package or envelope is detectable by an RF receiver. And c) fastening the element in the bridging position.

In the practice of the method, when the element is a separate label having adhesive on the second face thereof, (b) is practiced by bringing a label into bridging position with the adhesive engaging the package or envelope, and (c) is practiced by activating the adhesive so that the adhesive holds the label in place. Typically, the label adhesive is pressure sensitive adhesive (although other types of adhesive may be used) in which case (c) is practiced by applying pressure to the label.

When the element is part of a package or envelope containing pressure sensitive adhesive, (b) and (c) are practiced by bringing the adhesive into contact with another part of the package or envelope, and pressing on it to hold it in place. For example, the element may be a flap of a package or envelope, in which case (b) and (c) are practiced by folding the flap into contact with another part of the package or envelope and pressing on it. Preferably, (a) through (c) are practiced so that the package or envelope may be detected by an RF detector at a distance of more than 2 meters, e.g., about 2 to 5 meters.

The practice of the method of the invention allows great flexibility in where and when various aspects are practiced, rather than requiring all be done at the same place. For example, according to the invention, (b) and (c) may be practiced in a different, remote location than (a), and at a remote time, for example, at least about 2 days later, and essentially anytime later since the conductive ink applied to the package or envelope will not significantly deteriorate over time. Also, (a) may be practiced so that the first and second areas collectively are at least 50 square inches.

It is the primary object of the present invention to provide an enhanced, RFID system and method, particularly in association with a container, such as an envelope or package. This and other objects of the invention will become clear from an inspection of the detailed description of the invention and from the appended claims.

DETAILED DESCRIPTION OF THE DRAWINGS

According to the present invention, various embodiments are provided of an apparatus and a method for increasing the reading distance of an RFID chip. This is accomplished according to the present invention by providing a much larger antenna that can be provided or is provided in conventional systems, and a much larger antenna is provided in a simple and inexpensive manner by printing it directly on a container, such as an envelope (of any size and construction, preferably of substantially electrically non-conductive material), or package (such as a carton typically of cardboard or a like substantially electrically non-conductive material).

Figure 1:
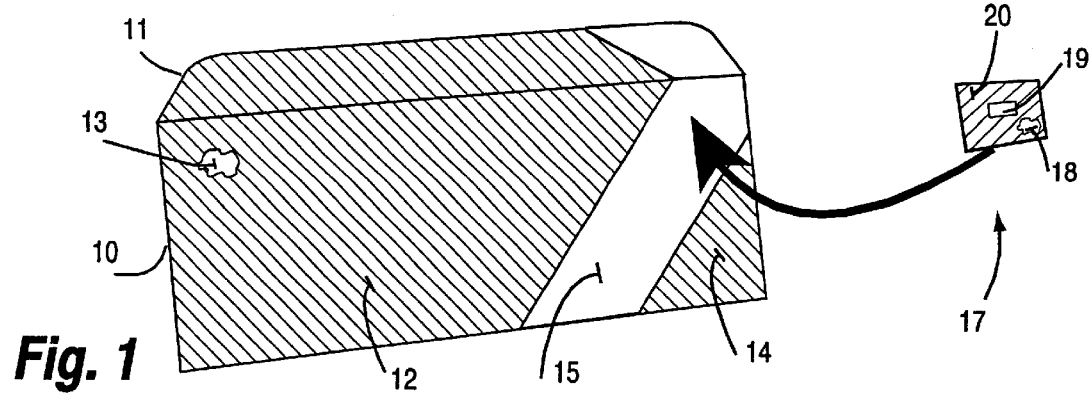
FIG. 1 is a front perspective view of an envelope according to the present invention and showing a rear perspective view of a label, in the form of a postage stamp, for use in association therewith.

FIG. 1 is a front schematic view of an exemplary envelope according to the present invention having a conventional envelope body 10 and sealing flap 11 which seals the open top of an envelope. According to the present invention, a first area 12 is disposed on the envelope, which area 12 is of electrically conductive material which is capable of forming an antenna for an RF system. Preferably, the first area 12 is printed on at least a first exterior wall or face 13 of the envelope, and in FIG. 1 the conductive material 12 is shown printed on both the majority of the front face of the body 10, and also at least the majority of the flap 11. Preferably the conductive material 12 is conventional conductive ink, such as conventional conductive ink having carbon particles interspersed therein.

The envelope of FIG. 1 also contains a second area of conductive ink 14. The area 14 may be printed exclusively or partially on the same surface 13 as the first area 12, or printed on different surfaces depending upon the particular situation. The first and second areas 12, 14 are separated by substantially electrically non-conductive material, which may be a material that is applied to the envelope surface 13, or preferably—in the case illustrated in FIG. 1—is an area 15 of the paper or other substantially electrically non-conductive material which forms the envelope. The dimensions of the separation area 15 are such as to fully separate the areas 12, 14 so that they can properly function as an RF antenna, yet allow them to be bridged by a connector including an RFID chip.

Figure 2:
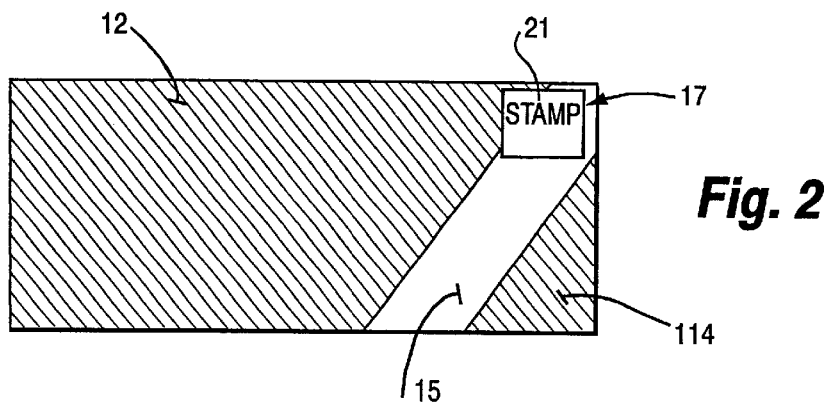
FIG. 2 is a front view of the envelope of FIG. 1 according to the invention with label applied thereto.

In the embodiment illustrated in FIGS. 1 and 2, the electrically conductive first and second areas 12, 14 are bridged by a label in the form of a postage stamp 17. In FIG. 1 a second face of the postage stamp is illustrated, at 18, having the RFID chip 19 associated therewith, typically mounted on the second face (although other mountings are possible), and the attachment mechanism is adhesive 20 covering all or part of the second face 18. In this particular embodiment, the adhesive 20 is conventional, electrically conductive, pressure sensitive adhesive. One type that is particularly suitable is ML 25251 Acheson Colloids, Co. Port Huron, Mich., although almost any type of electrically conductive adhesive is suitable. Alternatively, electrically non-conductive adhesive may be used which has been spot coated, on the surface 18, while electrically conductive material is provided on other portions of the surface 18 and connects the areas 12, 14 to the chip 19.

FIG. 2 shows the label in the form of postage stamp 17 applied to the envelope so that it bridges the electrically conductive areas 12, 14. The first phase of the label 17 is seen in FIG. 1, and in this particular instance, it has indicia 21 thereon, particularly in the form of postage indicia such as the amount of postage, the country issuing, and other design elements.

Figure 3:
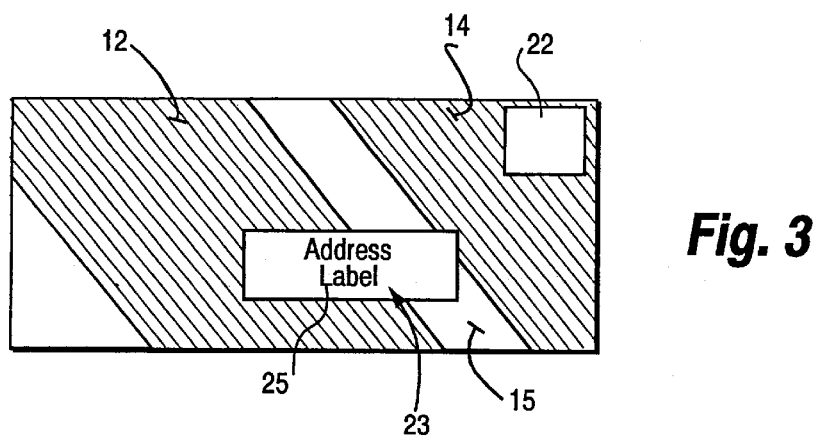
FIG. 3 is a view like that of FIG. 2 of an alternative form according to the invention wherein the label containing the RFID chip is an address label.

FIG. 3 shows another envelope embodiment according to the present invention that is similar to that of the embodiment of FIGS. 1 and 2 except that the form of the electrically conductive ink first and second areas 12, 14, and the positioning of the separating electrically non-conductive portion 15, are different. In this embodiment, the postage stamp 22 is simply a conventional postage stamp, and the RFID chip is provided on the address label 23, having address indicia 25 on the first, outer face thereof. The second, bottom face of the label 23 is preferably generally like the face 18 of the label 17 illustrated in FIG. 1 having an RFID chip mounted therewith, and having electrically conductive, pressure sensitive adhesive.

Figure 4:
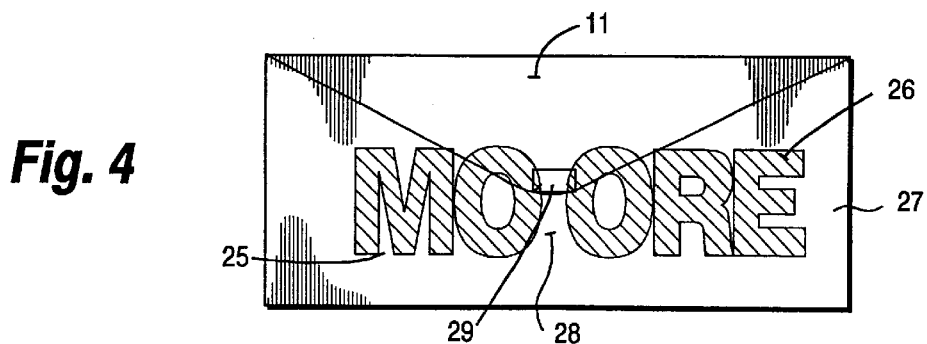
FIG. 4 is a rear view of an envelope according to the present invention where the conductive ink portions comprise letters which spell out a word.

FIG. 4 is another embodiment of the envelope according to the invention, in this case where the first area of electrically conductive ink 25 and a second area 26 are printed on the back face 27 and flap 11 of an envelope. In this particular instance, the first and second areas 25, 26 are in the form of one or more recognizable letters or characters, particularly in this case one of the areas (25) comprised of the letters "MO" and the other area (26) comprised of the letters "ORE", and spaced from each other by a substantially-nonconductive portion 28 of the back 27 and flap 11 of the envelope. The areas 25, 26 are bridged by a label 29 which has an RFID chip associated therewith, and preferably is basically the same as the label 25 only there is not necessarily any indicia on the first face (outer face) thereof.

The particular details in which the RFID chip (19 in FIG. 1) is connected to a label and not critical, but, for example, it may take conventional form (such as in conventional Motorola BiStatix™ labels, or U.S. Pat. No. 5,497,340) or may be connected such as shown in copending application Ser. No. 09/393,291, filed Sep. 10, 1999.

Figure 5:
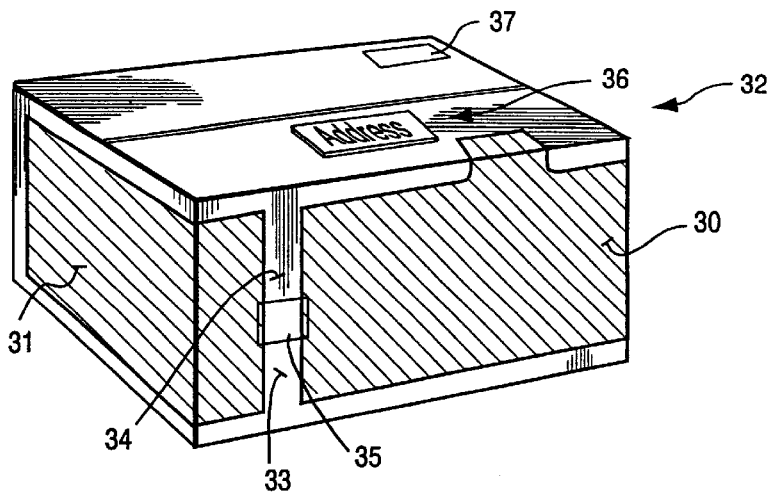
FIG. 5 is a top perspective view of a package according to the present invention.

FIG. 5 illustrates another embodiment according to the present invention wherein the container having the RF technology associated therewith is a package in the form of a carton. The first and second areas of electrically conductive ink 30, 31 are printed on different, and the same, walls or panels of the package 32, such as including the common wall 33. The electrically non-conductive material separation area 34 is also on the wall or panel 33, and comprises simply the primarily cellulosic material (such as cardboard, paperboard or the like) of which the container 32 is formed. In this case, the RFID chip is mounted on a label 35 substantially the same as the labels 23, 29, which bridges the antenna areas 30, 31. However, it is understood that by repositioning the components, label 35 may serve as an address label; although in the embodiment in FIG. 5, the address label 36 is shown as a distinct element on a different panel of the carton 32, and the delivery indicated (such as postage, delivery service authorization, or the like) 37 is also distinct from the RF technology.

While it is preferred that the electrically conductive areas 30, 31 forming the RF antenna are at least primarily provided on the exterior of the package 32, they can additionally, or instead, be provided on the interior of the package 32.

Figure 6:
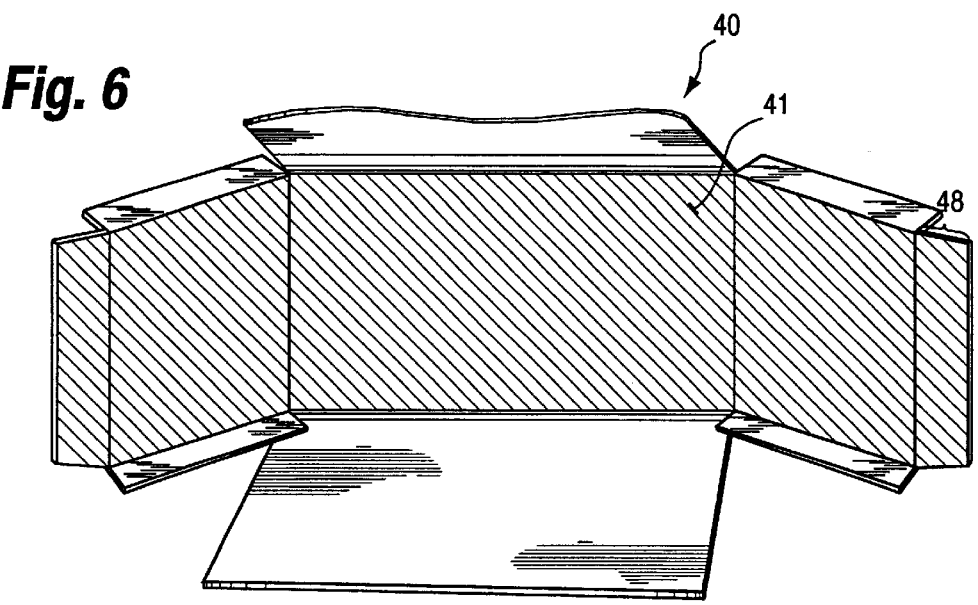
FIG. 6 is an interior exploded view of an alternative form of a package according to the present invention.

FIG. 6 is a schematic exploded view of a carton blank 40 showing the interior thereof in which electrically conductive ink is printed as the first area 41 on the inner face package 40. The second area may be even be printed on other interior panels (or the same interior panels but separated by a substantially, electrically non-conductive separation area like the area 34 or 28) or the second area might be printed on the exterior of the carton, and any suitable type of connector provided between them to form the RF antenna, such as a label having an electrically conductive, pressure sensitive adhesive in an RFID chip that goes from the inner area 41 to the exterior of the carton 40 where the second electrically conductive area is printed.

Figure 7:
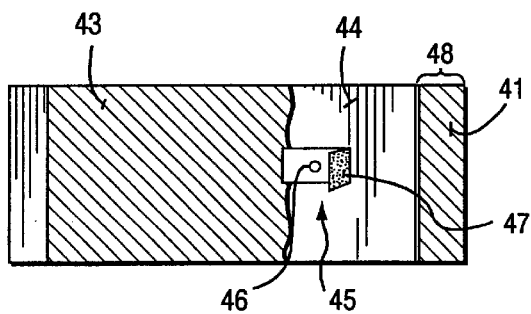
FIG. 7 is a side view, prior to complete assembly, of another embodiment of the package according to the present invention.

FIG. 7 is a side view with the carton of FIG. 6 partially assembled showing such an interconnection between the first area 41 and the second area 43 printed on an exterior panel, or the separation area of substantially electrically non-conductive material (comprising a part of the carton 40 material) 44 between them. A label 45 having an RFID chip 46 mounted thereon, and electrically conductive pressure sensitive adhesive 47, engages both part of the second area 43, and part of the first area 41 when the carton 40 flap portion 48 containing it is bent over to form the final carton. The flap 41 may be attached to the carton in any conventional manner, such as with staples, tape, or other mechanical fasteners, or by electrically conductive, pressure sensitive adhesive.

Figure 8:
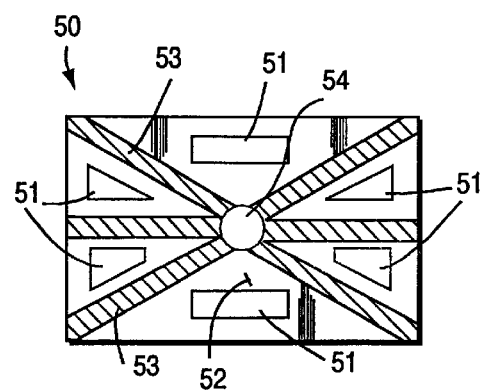
FIG. 8 is a rear view of an exemplary label according to the present invention.

FIG. 8 is a schematic illustration of the second, back, surface of a label 50 according to the present invention wherein instead of using electrically conductive pressure sensitive adhesive, conventional pressure sensitive adhesive is spot coated, in the form of the blocks 51, on the second face, and either electrically conductive conductors (such as copper film, or other electrically conductive material strips) are applied, secured in any conventional manner, including by adhesive, to the second face 52 of the label 50. The strips 53 of electrically conductive material are connected to the RFID chip 54, and when the label 50 is applied to bridge first and second electrically conductive areas of an RF antenna (such as the areas 30, 31 in FIG. 5) the final RFID product is produced.

Figure 9:
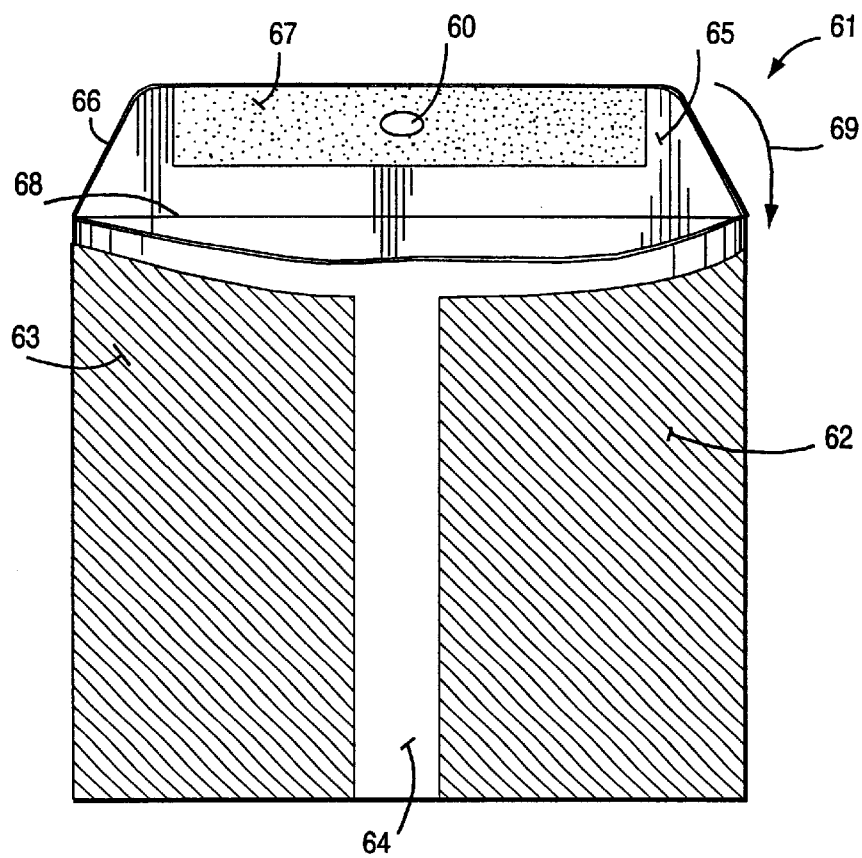
FIG. 9 is a rear view of an exemplary envelope according to the present invention prior to insertion of material therein, and sealing thereof.

FIG. 9 illustrates another embodiment according to the present invention in which the RFID chip 60 is associated with a large type mailing envelope 61 but is not on a separate element from the envelope 61, but rather is directly attached to envelope 61 itself. FIG. 9 shows the rear face of the conventional mailing envelope 61 of paper, Tyvek®, or like substantially electrically non-conductive material, having first and second electrical conductive ink portions 62, 63, respectively, printed thereon with the separation area 64 between them. The RFID chip 60 is mounted on the interface of the flap 65 of the envelope, and the interface 65 of the flap 66 also has electrically conductive, pressure sensitive adhesive 67 disposed thereon, for example, in the form of a strip or other pattern. While the RFID chip 60 is shown aligned with the nonconductive area 64 on the body of the envelope 61, it could be in other locations. In the FIG. 9 embodiment, when the flap 66 is folded over the fold line 68 in a conventional manner, as illustrated schematically by arrow 69, the electrically conductive adhesive 67 engages both the electrically conductive ink area 62, 63 and connects them to the RFID chip 60.

Figure 10:
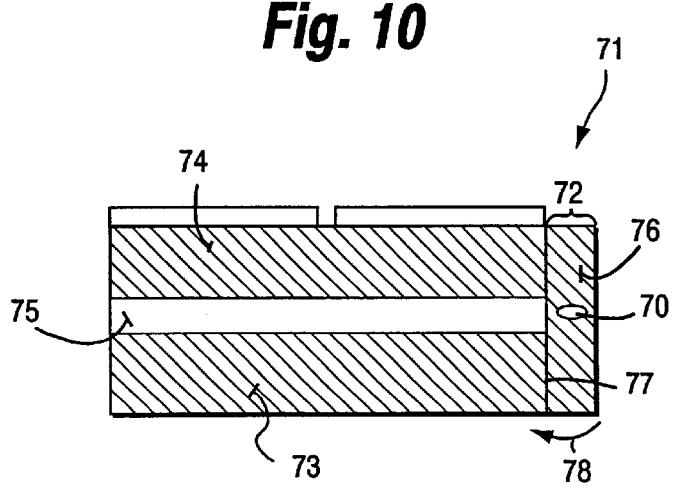
FIG. 10 is a side view of an exemplary package according to the present invention prior to the folding of the flap of the package to complete the formation thereof.

FIG. 10 shows another embodiment according to the invention in which the RFID chip 70 is part of the container rather than in a separate label or the like. In this case, the container is a conventional cardboard carton 71, having a flap or panel 72 that folds over to form the sealed carton. On one or more faces of the carton are printed electrically conductive ink areas 73, 74, with a substantially electrically non-conductive separation portion 75 between them. A flap or panel in addition to mounting the RFID chip 70 preferably has pressure sensitive adhesive 76 formed thereon so that when the flap or panel 72 is folded over about fold line 77, in the direction schematically illustrated by arrow 78 in FIG. 10, in addition to sealing the edges of the carton it connects the electrically conductive areas 73, 74.

In all of the embodiments, the electrically conductive ink first and second areas may be applied at one location, and the RFID chip at another location, remote from the first location, and also at a remote time (e.g., at least 2 days later, or many months or even years later).

In all of the embodiments, the amount of electrically conductive ink that forms the electrically conductive areas of the antenna (such as the areas 62, 63 in FIG. 9) are designed and sized to accommodate particular needs. In most circumstances, the first and second areas collectively are approximately 25 square inches–200 square inches, although they may be larger or smaller as particular needs dictate. Also, any specific or narrow range within the broad range may be provided and is specifically part of the invention. Typically, in order to allow sensing by a conventional RF receiver at a distance of at least about 2 meters, the collective areas of the portions of the antenna (e.g., 62, 63, FIG. 9) will be at least about 50 square inches. For example, if sensing or reading at a distance of about 3 meters is desired, the collective areas of electrically conductive ink (e.g., 62, 63) may be about 12 inches×12 inches or about 140–150 square inches.

In addition to being provided in the form of recognizable letters or characters (such as numbers, alphabet characters, symbols or the like) the electrically conductive areas may be in any aesthetic configuration desired, including geometric patterns or the like. By providing the electrically conductive ink areas in aesthetic manners, the person receiving the envelope or package will not even know that RF technology is associated therewith, and in this way too a larger antenna area may be provided without any adverse visual effects.

It will thus be seen that according to the present invention in a simple, effective and relatively-inexpensive manner, it is possible to significantly increase the read or sensing distance of an RFID chip. Instead of a conventional read distance of about a meter, according to the invention, read distances of about 2–5 meters, or even more, can be achieved.

While the invention has been described in connection with what is presently conceived to be the most practical and preferred embodiment thereof, it will be apparent to those of ordinary skill in the art that many modifications may be made thereof, within the scope of the invention, which scope is to be accorded the broadest interpretation of the appended claims so as to encompass all equivalent structures and methods.

What is claimed is:

1. A container comprising:

at least one container wall having a surface area;

a first area of conductive ink at least in part disposed on said container wall and spaced from a second area of conductive ink, said first and second areas of conductive ink separated by substantially electrically non-conductive material, said first and second areas of conductive ink comprising at least part of an RF antenna;

a label having a first face, and a second face;

said second face having adhesive over at least a portion thereof, capable of attaching said label to said container wall;

said label having an RFID chip mounted thereon; and electrically conductive material associated with said label second face and positioned to connect said first and second areas of conductive ink to said RFID chip when said label second face is placed in a position engaging said first and second areas of conductive ink and bridges said area of substantially non-conductive material, so that said container is detectable by an RF receiver.

2. A container as recited in claim 1 wherein said second area of conductive ink is disposed at least in part on said container wall.

3. A container as recited in claim 1 wherein said adhesive and said electrically conductive material comprise electrically conductive adhesive.

4. A container as recited in claim 3 wherein said electrically conductive adhesive is pressure sensitive.

5. A container as recited in claim 4 wherein said RFID chip is mounted on said label second face.

6. A container as recited in claim 5 wherein said label first face includes at least one of human and machine readable indicia thereon.

7. A container as recited in claim 1 wherein said first area is in the form of at least one recognizable letter or character.

8. A container as recited in claim 1 wherein said container comprises a substantially prismatic package primarily of cellulosic material; and wherein said substantially electrically non-conductive material separating said first and second areas of conductive ink comprises a part of said package substantially devoid of conductive ink.

9. A container as recited in claim 8 wherein said container wall is at least primarily on the exterior of said package.

10. A container as recited in claim 9 wherein said antenna areas are dimensioned, and said package is constructed, so that said package is detectable by an RF receiver at a distance of at least about three meters.

11. A container as recited in claim 10 wherein said adhesive and said electrically conductive material comprise electrically conductive pressure sensitive adhesive.

12. A container as recited in claim 1 wherein said container comprises a mailable envelope of substantially electrically non-conductive material.

13. A container as recited in claim 1 wherein said antenna areas are dimensioned, and said package is constructed, so that said package is detectable by an RF receiver at a distance of at least about two meters.

14. A container as recited in claim 13 wherein said first and second areas collectively are approximately 25 square inches–200 square inches.

15. A package or envelope comprising:

at least one wall having a surface area;

a first area of conductive ink at least in part disposed on said wall and spaced from a second area of conductive ink, said first and second areas of conductive ink separated by a substantially electrically non-conductive material, portion of said package or envelope, said first and second areas of conductive ink comprising at least part of an RF antenna;

an element having first and second faces, and having an RFID chip mounted therewith;

said second face of said element having electrically conductive pressure sensitive adhesive over at least a portion thereof, capable of attaching said element to said wall; and electrically conductive material associated with said element second face and positioned to connect said first and second areas of conductive ink to said RFID chip when said element second face is placed in a position engaging said first and second areas of conductive ink and bridges said area of substantially non-conductive material, so that said package or envelope is detectable by an RF receiver.

16. A package or envelope as recited in claim 15 wherein said element comprises an envelope or package flap, and wherein said wall comprises a face of an envelope or package which is engaged by said flap to seal said envelope or package.

17. A package or envelope as recited in claim 15 wherein said element comprises a separate and distinct label.

18. A package or envelope as recited in claim 16 wherein said RFID chip is mounted on said flap second face.

19. A package or envelope as recited in claim 15 wherein said first and second areas collectively are approximately 25 square inches–200 square inches.

20. A package or envelope as recited in claim 15 wherein said first area is in the form of at least one recognizable letter or character.

21. A method of constructing an RF detectable package or envelope having at least one wall, and of substantially electrically non-conductive material, using an element having an RFID chip mounted thereon and an electrically conductive bridging portion, comprising:

a) printing electrically conductive ink on the package or envelope, Including the at least one wall, to define first and second areas of electrically conductive ink, separated from each other by a portion of said package or envelope substantially devoid of electrically conductive ink;

b) bringing the element into bridging contact between the first and second areas of electrically conductive ink to connect the first and second areas of conductive ink to the RFID chip by the element bridging portion operatively engaging the first and second areas of conductive ink, so that the package or envelope is detectable by an RF receiver; and c) fastening the element in the bridging position.

22. A method as recited in claim 21 wherein the element is a separate label having adhesive on a second face thereof, and wherein b) is practiced by bringing the label into bridging position with the adhesive engaging the package or envelope, and wherein c) is practiced by activating the adhesive so that the adhesive holds the label in place.

23. A method as recited in claim 22 wherein the label adhesive is pressure sensitive adhesive, and wherein c) is practiced by applying pressure to the label.

24. A method as recited in claim 21 wherein the element is a part of the package or envelope containing pressure sensitive adhesive, and wherein b) and c) are practiced by bringing the adhesive into contact with another part of the package or envelope, and pressing on it to hold it in place.

25. A method as recited in claim 21 wherein a)–c) are practiced so that the package or envelope may be detected by an RF detector at a distance of more than 2 meters.

26. A method as recited in claim 24 wherein the element is a flap of a package or envelope, and wherein b) and c) are practiced by folding the flap into contact with another part of the package or envelope and pressing on it.

27. A method as recited in claim 21 wherein b) and c) are practiced in a different location than a), and at least about two days later.

28. A method as recited in claim 27 wherein a) is practiced so that the first and second areas collectively are at least fifty square inches.

* * * * *